United States Patent [19]

Nakayama et al.

[11] Patent Number: 4,947,271
[45] Date of Patent: Aug. 7, 1990

[54] MULTI-CHANNEL RECORDING APPARATUS

[75] Inventors: Tadayoshi Nakayama; Tsutomu Fukatsu, both of Kanagawa, Japan

[73] Assignee: Canon Kabushiki Kaisha, Tokyo, Japan

[21] Appl. No.: 116,058

[22] Filed: Oct. 29, 1987

[30] Foreign Application Priority Data

Nov. 5, 1986 [JP] Japan .................. 61-261843

[51] Int. Cl.$^5$ ........................... G11B 5/09
[52] U.S. Cl. ........................... 360/19.1; 360/32
[58] Field of Search .............. 360/19.1, 32, 8, 9.1, 360/18, 22, 23, 33.1; 360/33.1; 358/343

[56] References Cited

U.S. PATENT DOCUMENTS

4,622,600 11/1986 Okamota et al. ............... 360/32
4,740,845 4/1988 Kashida et al. ............... 360/32 X
4,769,722 9/1988 Itoh et al. ..................... 360/32 X
4,803,570 2/1989 Kashida et al. ............... 360/32 X
4,816,926 3/1989 Moriwaki et al. ............. 360/32 X Primary Examiner—Eugene R. Laroche
Assistant Examiner—Seung Ham
Attorney, Agent, or Firm—Robin, Blecker, Daley & Driscoll

[57] ABSTRACT

A multi-channel recording apparatus which is capable of recording one and the same main information by forming many parallel tracks in each of an m number of areas (m: an integer which is at least 1) among an n number of areas (n: an integer which is greater than m and is at least 2) longitudinally extending on a tape-shaped recording medium is arranged to record, in each of the m number of areas along with data relative to the main information, data indicative of that the data relative to the main information is recorded in and over a plurality of areas among the above stated areas when said number m is at least two.

6 Claims, 6 Drawing Sheets

MULTI-CHANNEL RECORDING APPARATUS

BACKGROUND OF THE INVENTION

1. Field of the Invention

This invention relates to a multi-channel recording apparatus and more particularly to a recording apparatus which is capable of recording data in each of a plurality of areas longitudinally extending on a tape shaped recording medium.

2. Description of the Related Art

During recent years, research and development efforts in the field of magnetic recording have come to be made to increase recording density. As a result, there has been developed a method of digitally recording an audio signal which is compressed in the directions of amplitude and time base. For example, in the case of a magnetic recording and/or reproducing apparatus (hereinafter referred to as VTR) of the two-rotary-head scanning type, the conventional arrangement to have a magnetic tape wrapped at least 180 degrees around a rotary cylinder has been changed to have the tape wrapped around the cylinder to a greater degree $(180° + \zeta°)$ and to record, within an extra wrapped portion of the tape thus obtained, an audio signal which is pulse code modulated (hereinafter referred to as PCM) and time-base compressed.

Figure 1:
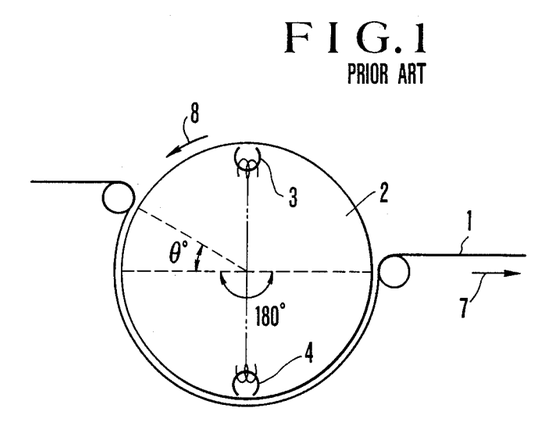
FIG. 1 is an illustration of a tape transport system employed in the conventional VTR.
Figure 2:
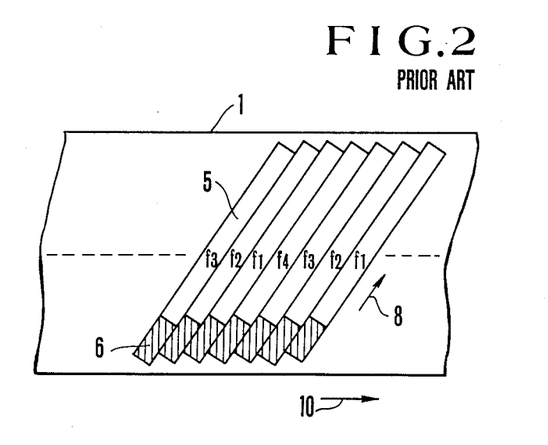
FIG. 2 is an illustration of a format for recording signals on a tape by the conventional VTR shown in FIG. 1.

FIG. 1 of the accompanying drawings shows the tape transport system of the VTR of the above stated kind. FIG. 2 shows recording tracks formed on the magnetic tape by the VTR of FIG. 1. Referring to FIGS. 1 and 2, the illustrations include a magnetic tape 1; a rotary cylinder 2; heads 3 and 4 which are mounted on the rotary cylinder 2 at a phase difference of 180 degrees and have azimuth angles different from each other; an area 5 in which a video signal is recorded within each of the recording tracks (hereinafter referred to as a video recording area); and another area 6 in which an audio signal is recorded within each of the recording tracks (hereinafter referred to as an audio area). The video area 5 corresponds to the 180° wrapped tape portion traced by the heads 3 and 4 while the audio area 6 corresponds to the $\theta°$ wrapped tape portion traced by the heads 3 and 4.

Figure 6:
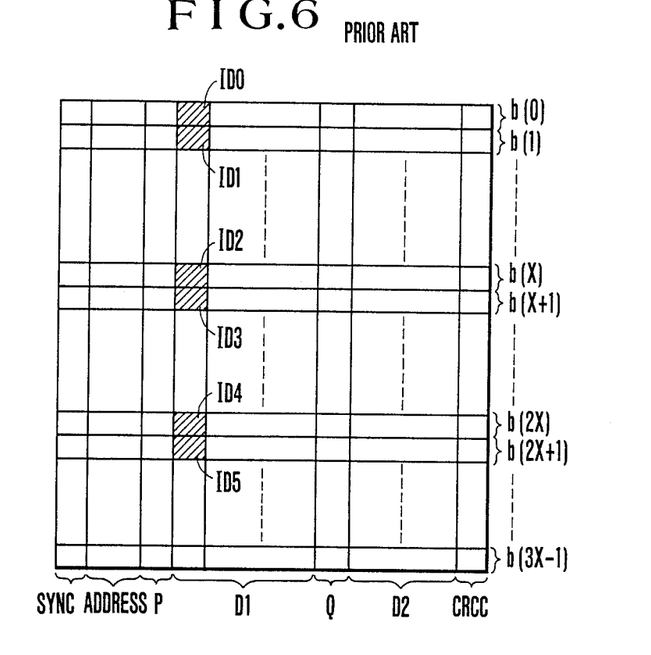
FIG. 6 is an illustration of a data format in accordance with which data is to be recorded in one track within each of areas shown in FIG. 4.

Meanwhile, there is another known method for high density recording, whereby: The VTR of the above stated kind is arranged to have an audio signal which differs from the audio signal recorded in the audio area also recorded in the video area 5. For example, with the angle $\theta°$ assumed to be 36°, five more audio areas which are similar to the audio area 6 are obtainable on the tape with the head allowed to rotate to the degree of 5 $\theta = 180$ degrees. Then, different audio signals can be discretely recorded in these different audio areas respectively in a PCM state.

Figure 3:
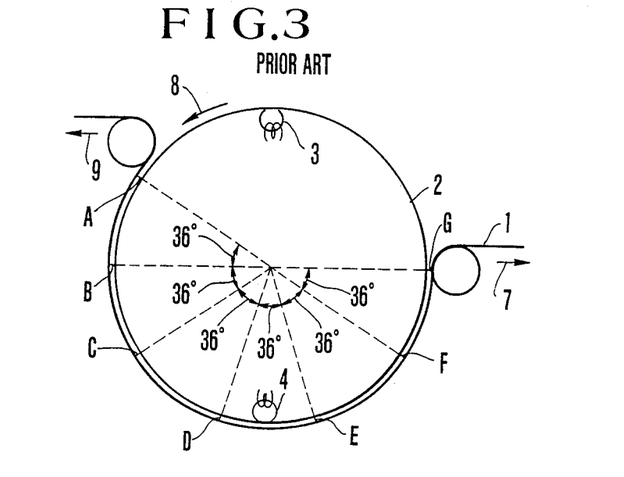
FIG. 3 is an illustration of the tape transport system of the conventional multi-channel, PCM audio signal recording and/or reproducing apparatus.
Figure 4:
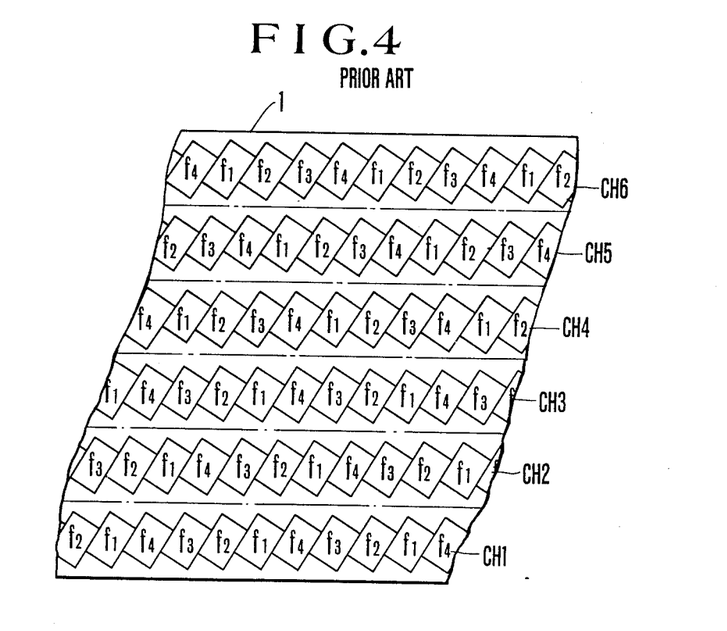
FIG. 4 is an illustration of a format for recording signals on a tape by the apparatus of FIG. 3.

FIG. 3 shows the tape transport system of a PCM (pulse code modulated) audio signal recording and/or reproducing apparatus of the above stated kind. FIG. 4 shows recording tracks formed on the tape by the apparatus of FIG. 3. Referring to FIG. 4, reference symbols CH1 to CH6 denote six channel areas. Each of the different channel areas CH1 to CH6 consists of an aggregation of tape portions traced by the heads 3 and 4 at the same rotation angle of the rotary cylinder 2. In cases where the audio signal is to be recorded on a tape in a PCM state, the audio signal undergoes a non-linear compressing process while the signal is in the stage of an analog signal. After that, the compressed audio signal has its frequency band limited by a low-pass filter to 0 to $\frac{1}{2}$ fs (fs: a sampling frequency) before it is converted into digital data of 10 bits by an A/D (analog-to-digital) converter. Following that, the 10-bit data is non-linearly compressed to 8-bit digital data by means of a quantization table or the like. The 8-bit data is then subjected to a series of error correcting processes including an interleave process, CRCC (cyclic redundancy check code) and parity word adding process, etc. The digital data thus processed undergoes a PCM process before recording on the magnetic tape. During reproduction, the PCM audio data which is thus recorded through the above stated processes is taken out by a PLL (phase-locked loop) according to a bit clock signal locked in the data. The data is subjected to an error detecting process which is performed through the CRCC and an error correction process which is performed by means of the parity word. The data is then expanded from 8-bit data to 10-bit data and is converted into an analog signal by a digital-to-analog (hereinafter referred to as D/A) converter. The analog signal thus obtained is analog expanded into an audio signal through a post-filter.

Figure 5:
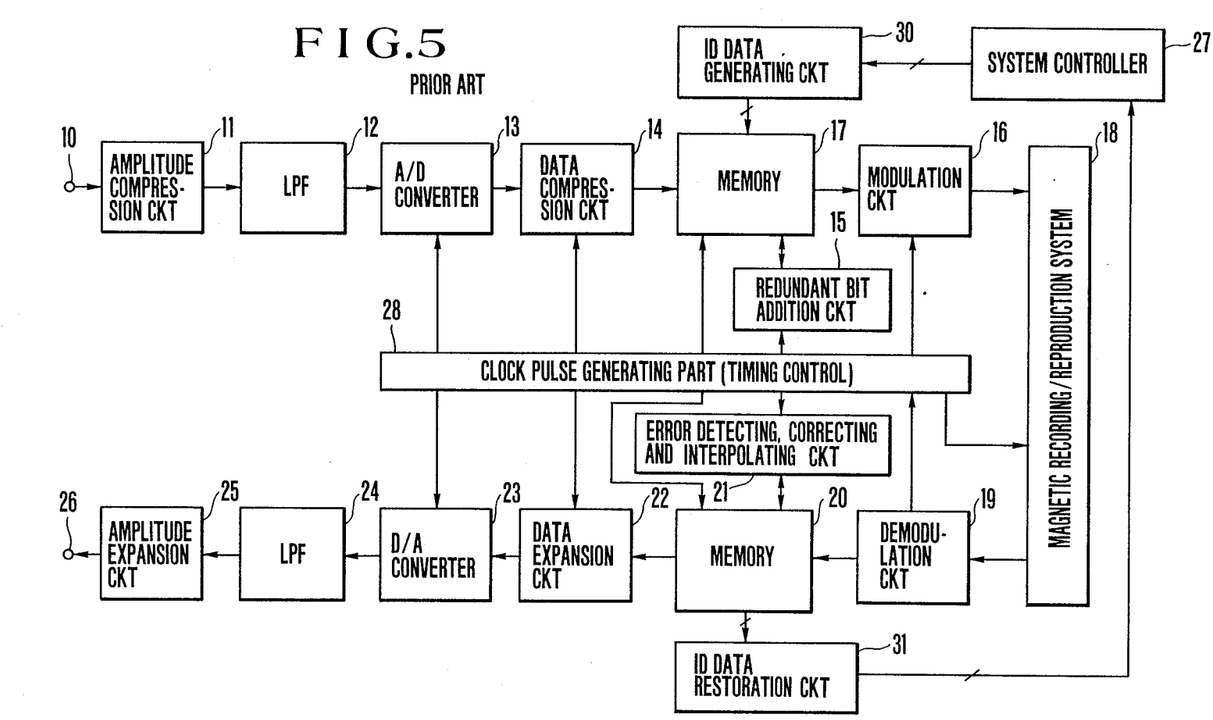
FIG. 5 is a block diagram showing the circuit arrangement of the apparatus of FIG. 3.

FIG. 5 is a block diagram showing the above stated signal processing operation. Referring to FIG. 5, an amplitude compression circuit 11 is arranged to compress in the direction of amplitude an analog audio signal which comes via an input terminal 10. A low-pass filter (LPF) 12 is a pre-filter which is arranged to limit the frequency band of the analog audio signal. An A/D converter 13 converts the analog audio signal into 10-bit digital data. A data compression circuit 14 compresses the 10-bit data into 8-bit data. A circuit 15 is arranged to add redundant bits such as a CRCC, a parity word, etc. A modulation circuit 16 performs digital modulation. A reference numeral 17 denotes a memory. An ID data generating circuit 30 is arranged to produce, on the basis of the output of a system controller 27, ID data which will be described later. The memory 17 is arranged to receive the redundant bit which is produced from the circuit 15, the ID data which is produced from the circuit 30 and the audio data produced from the data compression circuit 14. At the memory 17, these data are arranged in accordance with a data format which will be described later and are supplied to the modulation circuit 16 at a given timing. The modulation circuit 16 is arranged to digitally modulate the data from the memory 17 into a form suited for magnetic recording and supplies the modulated data to a magnetic recording/reproduction system 18. The system 18 records the data in one of the plurality of areas CH1 to CH6 on the tape in accordance with a recording format which is as shown in FIG. 4. A clock pulse generating part 28 is arranged to generate clock pulses to be used for controlling the operating timing of each applicable part.

The circuits of the reproduction system includes a demodulation circuit 19 which corresponds to the circuit 16 and is arranged to perform digital demodulation; a memory 20; an error detecting, correcting and interpolating circuit 21; a data expansion circuit 22 which is arranged to expand the 8-bit data into 10 bit data; a D/A converter 23; a post-LPF 24; and an amplitude expansion circuit 25 which is arranged to perform analog signal expansion.

At the memory 20, the data which is demodulated by the circuit 19 is restored to the original data arrangement. Meanwhile, the audio data which is error corrected and interpolated by the circuit 21 is supplied to the data expansion circuit 22. The ID data is supplied to the ID data restoration circuit 31. At the ID data restoration circuit 31, the reproduced ID data is brought back to information data similar to the original data and is then supplied to the system controller 27 to determine the control action to be performed by the controller 27.

The following describes an example of data format conventionally used for the apparatus of the above stated kind: FIG. 6 shows the data format for recording data in one track within each recording area. More specifically, FIG. 6 shows by way of example a data format for including PCM audio data corresponding to the audio signal of two channels of 1/60 sec. In the data matrix of FIG. 6, a column SYNC is for synchronizing data; a column ADDRESS for address data; columns P and Q for error correcting redundant data; and a column CRCC for known CRCC check code data. Each of columns D1 and D2 consists of a plurality of columns and includes audio signal information for two channels. Rows b(0) to b(3x−1) denote the rows of the data matrix. Each row forms a data block with data recorded from the left-hand side of the row to the right-hand side thereof as viewed on the drawing. For example, in the row b(0), the data of the column ADDRESS is recorded following the data of the column SYNC and is followed by the data of the columns P, etc. one after another. In the row b(x+1), the data of the column SYNC is recorded after the data of the last column is recorded in the row b(x). Data recording for one track comes to an end with the data of the last column in the row b(3x−1) is recorded. In the first column among the columns D1, six data ID0 to ID5 of the rows b(0), b(1), b(x), b(x+1), b(2x) and b(2x+1) represent additional (auxiliary information) other than the information of the audio signal and hereinafter will be called as ID data.

The details of the data ID0 to ID5 are as shown in Tables 1 and 2. Referring to Tables 1 and 2, data ID0 is mode designation which consists of eight bits and indicates the kinds of information carried by the data ID1 to ID5. The data ID1 to ID4 in each of the modes 1 to 6 indicate information as shown in Table 1.

TABLE 1

| mode | ID data | | | | | | Remarks |
|---|---|---|---|---|---|---|---|
| | ID0 | ID1 | ID2 | ID3 | ID4 | ID5 | |
| 1 | 1 | hr | min | sec | file No. | Y | counter |
| 2 | 2 | pro. No. | Cut No. | min | sec | Y | cut data |
| 3 | 3 | year | month | day | day/week | Y | time |
| 4 | 4 | hr | min | sec | File No. | Y | time |
| 5 | 5 | pro. No. | hr | min | sec | Y | pro. data |
| 6 | 6 | Pro. hr No. | min | sec | Y | tape data | |
| 7 | 7 | X | — | — | — | Y | new ID |

TABLE 2

| Bit No. | ID5 (Y) in each mode | ID1 (X) in mode 7 |
|---|---|---|
| 1 | validity | validity |
| 2 | audio signal form | tape travel direction |
| 3 | audio signal form | next track No. |
| 4 | L ch. audio, etc. | next track No. |
| 5 | R ch. audio, etc. | next track No. |
| 6 | record beginning part | track pitch |
| 7 | record end part | track pitch |
| 8 | dubbing prevention | part corresponding to |

TABLE 2-continued

| Bit No. | ID5 (Y) in each mode | ID1 (X) in mode 7 |
|---|---|---|
| | | silent part. |

In other words, the data ID1 to ID4 show time information as obtained by a tape counter in the mode 1; time information for every cut in the mode 2; present time information in the modes 3 and 4; time information for every program in the mode 5; and in the mode 6 time information obtained from the leader part of each tape.

In Table 1, "pro. No." means a program number, "cut No." a cut number and "file No." a file number. Generally, in the case of a system wherein all data are to be replaced with data of all "0" when any data error occurs, the system is preferably to have the data of all "0" not readily occur. In that case, each data is arranged to have 0 expressed with all "1", and 1 with 11111110. In Table 1, symbols X and Y respectively denote 8-bit data. Information represented by these data X and Y is as shown in Table 2. The symbol Y indicates the data ID5 in each of the modes 1 to 7. The first bit of the data Y indicates whether the 8-bit data Y is valid or invalid. The second and third bits indicate whether the above stated audio information recorded in two channels is in a monaural-signal or stereo-signal form or the like. The fourth and fifth bits indicate whether audio signal information or some other information is to be recorded in the corresponding parts of the first and second channels. The sixth and seventh bits are arranged to be at "1" at the record beginning part and the record ending part of the audio signal respectively. The eighth bit is arranged to be at "1" in case that dubbing is to be prevented.

Meanwhile the 8-bit data X indicates information related to this invention as shown also in Table 2. The first bit of the data X indicates whether the data X is valid or invalid. In the case of a system arranged to obtain data consisting of all "0" in the event of occurrence of a data error as mentioned in the foregoing, the first bit of the data X is preferably arranged to be at "1" if the data is valid and at "0" is the data is invalid. The second bit of the data X indicates the direction in which the tape is allowed to travel for recording. The third, fourth and fifth bits of the data X indicate one of the areas CH1 to CH6 in which recording is to be performed next time or indicate, for example, that the recording is to be brought to a stop by showing a next track number, etc. The sixth and seventh bits of the data X indicate the track pitch at which the recording tracks mentioned in the foregoing are to be formed. The eighth bit of the data X is arranged to become "1" only at a part corresponding to a silent part for the purpose of facilitating a leader finding operation. For example, if the analog audio signal coming via the input terminal 10 of the recording system shown in FIG. 5 remains at a level close to a zero level over a given period of time, the eighth bit is at "1" for a given period of time, that is, for a given number of recording tracks.

The form of the main information included in the information signal recorded in the manner as described above is distinguishable by the medium of the ID data. The system described is thus arranged to be capable of recording and reproducing, in addition to the audio signal, a video signal, character information, etc. Therefore, information signals of varied kinds can be recorded in varied combinations.

With the conventional apparatus arranged in this manner, however, the ID data which is recorded in each area as an auxiliary information signal is arranged only for the channel in which the area is included. In cases where main information of one and the same kind is recorded in a plurality of areas by simultaneously using a plurality of channels, the ID data becomes inapposite to a reproducing operation on the main information recorded straddling or spreading over the plurality of channels.

The recording process for recording the main information of one and the same kind on the tape straddling a plurality of recording areas, therefore, has been limited to recording the main information of one kind in given areas in accordance with a predetermined rule.

SUMMARY OF THE INVENTION

This invention is directed to the solution of the above stated problem of the prior art. It is therefore an object of the invention to provide a multi-channel recording apparatus of the kind simultaneously using at least two of a plurality of areas longitudinally extending on a tape-shaped recording medium with the apparatus being arranged to facilitate reproduction of signals thus recorded on the medium.

It is another object of this invention to provide a multi-channel recording apparatus which is capable of recording data in such a manner that, in reproducing information recorded on a recording medium straddling a plurality of any areas provided on the medium, the recorded information can be automatically reproduced.

Under this object, a recording apparatus arranged according to this invention as an embodiment thereof comprises recording means for recording signals by forming many parallel tracks in an n number (n: an integer which is at least 2) of recording areas longitudinally extending on a tape-shaped recording medium; input means for receiving main information; recording signal forming means for forming, from the main information, recording signals in an m number of channels (m: an integer which is at least 1 but is less than n); adding means for adding, to each of the recording signals of the m channels, sub-information including a first data which indicates, when the number m is 2 or more than 2, that the signals relative to the main information are recorded in and over a plurality of areas included in the n number of areas; and means for supplying the recording means with the recording signals of the m number of channels at such a timing that the recording signals of the m channels are recorded by the recording means in the m number of areas among the n number of areas.

It is a further object of this invention to provide a multi-channel recording apparatus which permits simplification of circuit arrangement for reduction in cost thereof and is capable of simultaneously recording a video signal and an audio signal.

Under that object, a recording apparatus arranged according to this invention as another embodiment thereof comprises recording means for recording signals by forming many parallel tracks within each of an n number (n: an integer which is at least 2) of areas longitudinally extending on a tape shaped recording medium; input means for receiving information of first and second kinds; recording signal forming means for forming first and second recording signals from the first and second kinds of information; and means for supplying the recording means with the first and second recording signals at such a timing that the first recording signal is recorded in a first area within the n number of areas and the second recording signal in a second area within the n number of areas.

The above and other objects and features of the invention will become apparent from the following detailed description of an embodiment thereof taken in conjunction with the accompanying drawings

DETAILED DESCRIPTION OF THE PREFERRED EMBODIMENT

Figure 7:
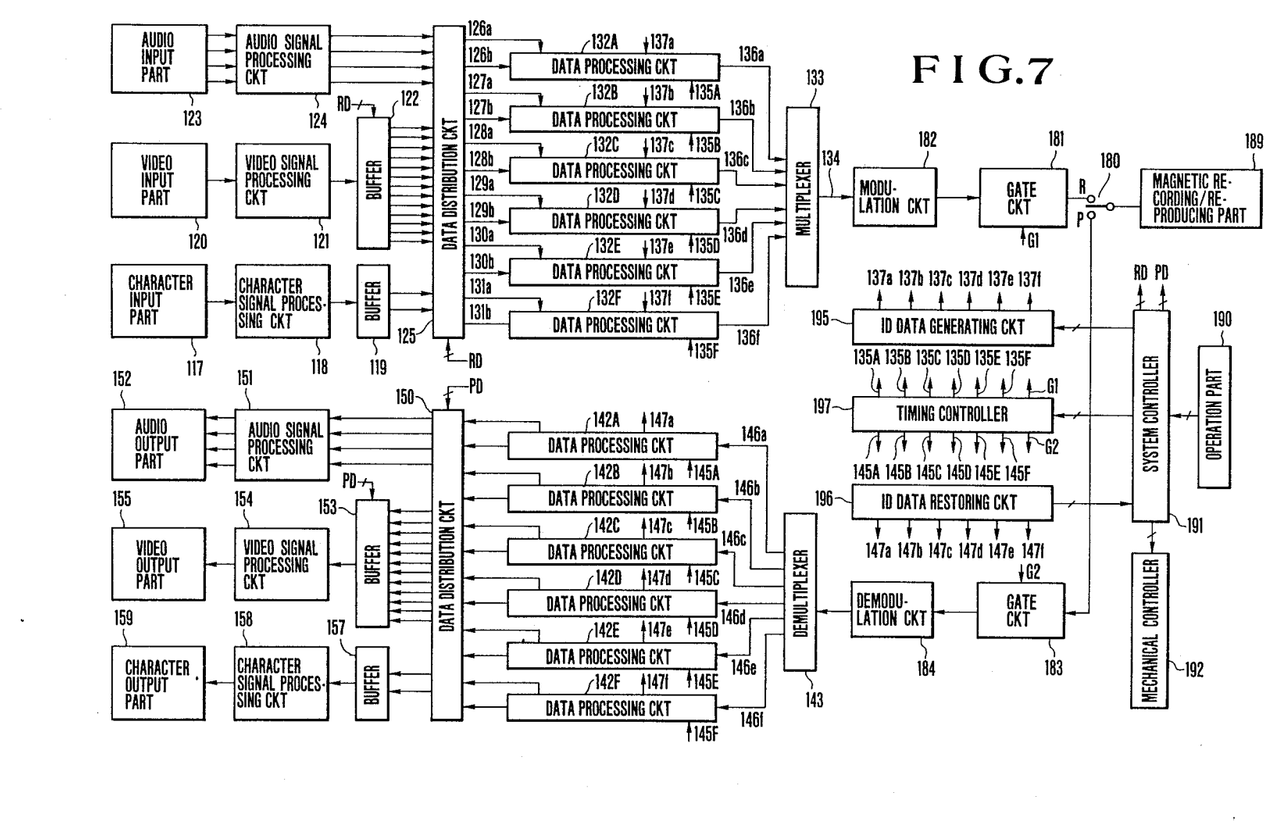
FIG. 7 is a block diagram showing the arrangement of a multi-channel recording apparatus according to this invention.

FIG. 7 shows the arrangement of a multi-channel recording and reproducing apparatus arranged according to this invention as an embodiment thereof. An audio signal input part 123 is arranged to be capable of receiving audio signals of a total of four channels including two 2-channel audio signals. An audio signal processing circuit 124 is arranged to be capable of discretely processing in parallel the audio signals of the different channels received via the input part 123. The circuit 124 processes the audio signal of each channel in the same manner as the LPF 12, the A/D converter 13 and the data compression circuit 14 of FIG. 5. The audio signal processing circuit 124 thus supplies audio data of four channels to a data distribution circuit 125.

A video input part 120 is arranged to receive a video signal and to supply it to a video signal processing circuit 121 to have it A/D converted and subjected to a data compressing process, etc. at the circuit 121. The output of the circuit 121 is supplied to a buffer circuit 122. The buffer circuit 122 then takes in data for one of two picture planes at a timing determined on the basis of applicable data included in recording control data RD which is supplied from a system controller 191 and is arranged to produce data of each channel at the same data rate as that of the audio data of each channel produced from the audio signal processing circuit 124. The number of output channels of the buffer circuit 122 is selectable from among 2, 4, 6, 8, 10 and 12. The period of time required by the circuit 122 in producing the data therefrom varies with the number of the output channels. The selected number of output channels is determined by applicable data which is included in the above stated recording control data RD and indicates how many areas are to be used for recording the video data.

A character input part 117 is arranged to receive character data, which is supplied to a character signal processing circuit 118 to be subjected to a data compressing process. The compressed character data thus obtained is supplied to a buffer circuit 119, which takes in a given amount of character data. The buffer circuit 119 then produces data outputs in two channels each at the same data rate as that of each channel output of the above stated audio signal processing circuit 124.

An operation part 190 is arranged to permit the operator of the apparatus to designate the manner in which the above stated data of three kinds are to be recorded and to instruct the system controller 191 to produce the recording control data RD. In other words, area numbers assigned to specific areas in which the audio data, the video signal and the character data are to be recorded are designated by the operator as desired. Up to two areas can be designated for recording the audio data and up to six areas for the video signal or data. The number of output channels of the buffer circuit 122 is changed according to the number of areas designated for recording the video data.

A data distribution circuit 125 is arranged to supply the data obtained from each two-channel data source to each of six data processing circuits 132A to 132F which are arranged to process data for recording in areas CH1 to CH6 as applicable on the basis of the recording control data RD. For example, in case that the two-channel stereo audio signal of one channel is to be alone recorded, the data of two channels included in the data output of the audio signal processing circuit 124 is supplied to only one of the six data processing circuits 132A to 132F.

Figure 8:
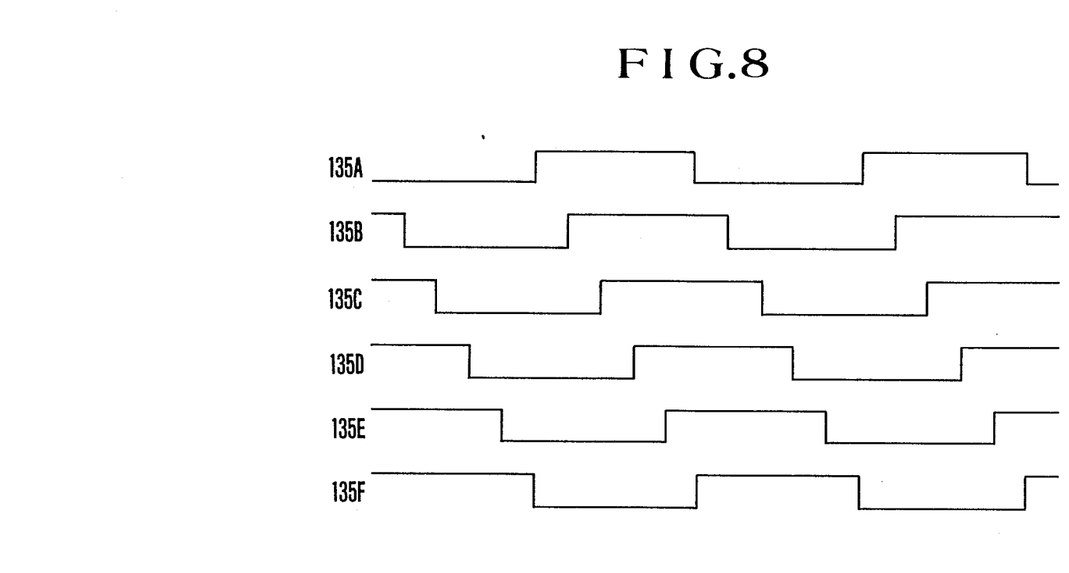
FIG. 8 is a timing chart showing the operation timing of the essential parts of FIG. 7.

Each of the data processing circuits 132A to 132F is arranged to perform a data processing operation which corresponds to the operations of the memory 17 and the redundant bit adding circuit 15 shown in FIG. 5. Meanwhile, ID data 137a to 137f are arranged to be supplied from an ID data generating circuit 195. The details of this will be described later. The data processing circuits 132A to 132F perform data processing actions at a timing determined by a timing controller 197. For this purpose, the timing controller 197 produces timing signals 135A to 135F as shown in FIG. 8 and supplies them to the circuits 132A to 132F. The timing of each of these signals 135A to 135F is shifted from that of another by a period of time required by the rotary head in traversing one recording areas. Each of the data processing circuits 132A to 132F is arranged to produce data according to the timing at which each rotary head traces each of the areas CH1 to CH6. The data thus produced from these circuits 132A to 132F are rearranged into serial data by a multiplexer 133. The data 134 which is thus serially produced by the multiplexer 133 is supplied to a digital modulation circuit 182 to be digitally modulated there. The digitally modulated data is supplied to a gate circuit 181. The gate circuit 181 is arranged to allow the data or signal to be produced therefrom in accordance with a timing pulse G1 produced from the timing controller 197 only when the rotary head is tracing the applicable recording area. The signal thus produced is supplied via a terminal disposed on one side R of a switch 180 to a magnetic recording/reproducing part 189 which includes rotary heads arranged as shown in FIG. 3. The signal is thus recorded on a magnetic tape.

In the case of this embodiment, each of the tape processing circuits 132A to 132F produces data which is in accordance with a data format similar to the format shown in FIG. 6 and is produced as information to be recorded in one recording track within each recording area. The ID data 137a, 137b, 137c, 137d, 137e and 137f which are supplied also to the data processing circuit 132A, 132B, 132C, 132D, 132E and 132F are arranged to be as follows: Each of the ID data 137a to 137f includes data ID0 to ID5. The data ID0 to ID5 are additional information data as stated in the foregoing. One block of data which is for one track consists of 8 bits×6 words.

Assuming that each data is of the hexadecimal notation and expressed, for example, as EB=11101011, the data ID0 to ID4 are assumed to be set as follows:

| ID0: | 03 | ID1: | 77 | ID2: | F7 |
| ID3: | EB | ID4: | FB | | |

Then, the data ID5 is arranged to be of 8-bit data according to Table 2 and, for example, to indicate that a stereo audio signal is recorded. Since the data ID0 is "03", i.e. "00000011," the data ID1, ID2, ID3 and ID4 are used for indicating the year, month, day and day of the week according to Table 1 and thus there obtains auxiliary information which represents Aug. 14, 1988, Thursday. In accordance with the conventional arrangement, this auxiliary information has indicated, within a single area, the information together with the attribution thereof. Whereas, in the case of this embodiment, it is possible to arrange the auxiliary information to include also some other information relative to the main information to be recorded in other areas or channels for which the head has different rotation angle ranges. Some examples of such arrangement are now discussed.

In a first example, audio information is recorded in the area CH1, character information in the area CH2 of FIG. 4 and still picture information in other areas CH3 to CH6. In a second example, still picture information A is recorded in the areas CH1 to CH3 of FIG. 4 and another still picture information B in the areas CH4 to CH6. In these cases, the ID generating circuit 195 of this embodiment generates data in the following manner:

Information of three different kinds respectively indicating CH1, CH2 and CH3+CH4+CH5+CH6 must be discretely reproduced in the case of the first example while information of two kinds indicating CH1+CH2+CH3 and CH4+CH5+CH6 must be discretely reproduced in the case of the second example. It is thus necessary to find the channels in which one and the same kind of information is recorded. In accordance with the arrangement of this embodiment, the source of recording information is first found from the data ID0. More specifically, the data ID0 is arranged to indicate:

With the data ID0 set at 00–0F (00000000–00001111): Audio information. At 00–07 (00000000–00000111): Audio information in a single channel. At 08–0F (00001000–00001111): Audio information in a plurality of channels At 10–1F (00010000–00011111): Character information. At 10–17 (00010000–00010111): Character information in a single channel. At 18–1F (00011000–00011111): Character information in a plurality of channels. With the embodiment arranged in this manner, the 8-bit data indicates at 20 to 2F (00100000–00101111): Still picture information. At 20–27 (00100000–00100111): Still picture information in a single channel. At 28-2F (00101000-00101111): Still picture information in a plurality of channels. Then, by giving attention only to the fourth bit counting from the lowest one, a discrimination can be made as to whether the information spreads over a plurality of channels or is completed within a single channel. The kind of information likewise can be found from the upper four bits. Meanwhile, the lower three bits are usable as they are for indicating the conventionally prescribed modes. As for the data ID1, however, the data is differently prescribed in a manner as will be described later.

With the information thus having been confirmed from the data ID0 as to whether or not it spreads over a plurality of channels, the data ID1 is used for finding, among other things, the part of the series of information is mainly constituted by these channels.

An example of prescription for the data ID1 is as follows: In case that one and the same kind of main information is recorded in and over a plurality of channels or areas, the channel in which the data ID1 is recorded is indicated by using the upper two bits as "11" if the channel in question is the first of the channels having the record of the main information (a channel of the youngest number), as "01" if it is the last of these channels or as "10" if it is an intermediate one among these channels. The upper two bits are thus used for locating the channel in which the data ID1 is recorded.

The lower six bits correspond respectively to the areas (or channels) CH1 to CH6 counting from the lowest bits. These bits are set at "1" for the channels having the record of the same main information as the channel in which the data ID1 is recorded. This arrangement clearly shows all the channels that have the record of the same main information.

Therefore, in the case of the above stated first example, the area CH3, the areas CH4 and CH5 and the area CH6 may be indicated by the data ID1 as follows:

| CH3: | 11111100 | CH4 and CH5: | 10111100 |
| CH6: | 01111100 | | |

In the case of the second example:

| CH1: | 11000111 | CH2: | 10000111 | CH3: | 01000111 |
| CH4: | 11111000 | CH5: | 10111000 | CH6: | 01111000 |

With the auxiliary information signal prescribed in the above stated manner and recorded along with the main information, a series of information recorded in and over a plurality of channels or different series of information can be recorded or reproduced by carrying out a signal processing operation in accordance with the auxiliary information.

The reproducing operation of the embodiment is briefly described as follows: Reproduced signals are supplied via the connecting side P of the switch 180 to a gate circuit 183. The gate circuit 183 remains in an open state immediately after commencement of reproduction to enable the ID data reproduced from all the recording areas to be restored. After that, the gate circuit 183 comes to gate only a signal reproduced from an applicable area.

More specifically, under a condition obtained immediately after commencement of reproduction, the signals recorded in each of the areas CH1 to CH6 are digitally demodulated by a demodulation circuit 184. A demultiplexer 143 supplies the demodulated signals to data processing circuits 142A to 142F respectively. Each of the data processing circuits 142A to 142F then supplies the ID data reproduced from each area to an ID data restoring circuit 196 to have each of the additional information of different kinds restored there. The system controller 191 then produces reproduction control data PD on the basis of the restored additional information. The control data PD then determines the output timing of a gate pulse signal G2.

Following this, the demultiplexer 143 supplies each of reproduced data obtained from applicable areas to the data processing circuit 142A to 142F. A data distribution circuit 150 supplies the outputs of the processing circuits 142A to 142F which are data of a total of 12 channel to applicable ensuing processing systems according to the reproduction control data indicating the kind of the data on the basis of the ID data which is prescribed as mentioned in the foregoing.

In the case of the above stated first example where the audio information is recorded in the area CH1, the character information in the area CH2 and the still picture information in the areas CH3 to CH6, digital signals of two channels are supplied to the audio signal processing circuit 151. The circuit 151 performs a data expanding process and then D/A converts the digital signals into an analog stereo signal. The analog signal is produced from an audio output circuit 152. The data processing circuit 142B produces the character data in two channels. The character data is supplied to a buffer circuit 157. The buffer circuit 157 brings the character data back to the original transmission bit rate. After that, the character data is supplied to a character signal processing circuit 158 to be brought back into an original character code. The character code thus obtained is produced from a character output part 159.

The data processing circuits 142C to 142F produces data in eight channels in all. The eight channel data is supplied via the data distribution circuit 150 to a buffer circuit 153. The buffer circuit 153 then restores within a memory a still picture signal for one picture plane from the eight channel data. The restored still picture signal is repeatedly produced from the buffer circuit 153 and is supplied to a video signal processing circuit 154. The signal is D/A converted at the circuit 154 and is then produced from a video output part 155.

What is claimed is:

1. A recording apparatus comprising:
   (a) recording means for recording signals by forming many parallel tracks in an n number (n: an integer which is at least 2) of recording areas longitudinally extending on a tape-shaped recording medium;
   (b) input means for receiving main information;
   (c) recording signal forming means for forming, from said main information, recording signals in an m number of channels (m: an integer which is at least 1 but is less than n);
   (d) adding means for adding, to each of said recording signals of said m channels, sub-information including a first data which indicates whether the number m is 1 or more than 2; and
   (e) means for supplying said recording means with said recording signals of the m number of channels so that the recording signals of said m channels are recorded by said recording means in an m number of areas among said n number of areas.

2. An apparatus according to claim 1, wherein said sub-information further includes second data indicating all of said m number of areas in which said recording signals of the m number of channels are recorded.

3. An apparatus according to claim 1, wherein said recording means includes a rotary head which is arranged to transversely trace said n number of areas; and said recording signals of the m number of channels are recorded by said rotary head in a time sharing manner.

4. An apparatus according to claim 1, wherein said main information includes a video signal.

5. An apparatus according to claim 4, wherein said recording signal forming means includes means for extracting one picture plane portion of said video signal.

6. A recording apparatus comprising:
(a) recording means for recording signals by forming many parallel tracks in an n number (n: an integer which is at least 2) of recording areas longitudinally extending on a tape-shaped recording medium;
(b) input means for receiving main information;
(c) recording signal forming means for forming, from said main information, recording signals in an m number of channels (m: an integer which is at least 1 but is less than n);
(d) adding means for adding, to each of said recording signals of said m channels, sub-information including a subordinate data which indicates, all of m number of areas where said recording signals of the m number of channels are recorded; and
(e) means for supplying said recording means with said recording signals of the m number of channels so that the recording signals of said m channels are recorded by said recording means in said m number of areas among said n number of areas.

* * * * *